Oct. 15, 1957 U. O. BLOMQUIST 2,809,811
AIR PREHEATER WITH HEATING AND TEMPERING MEANS
Filed May 11, 1951
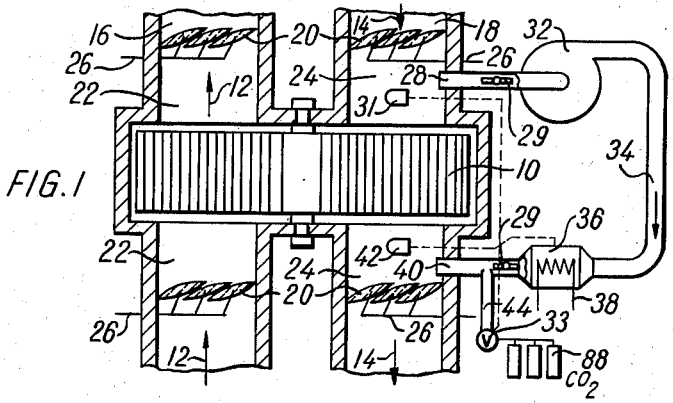
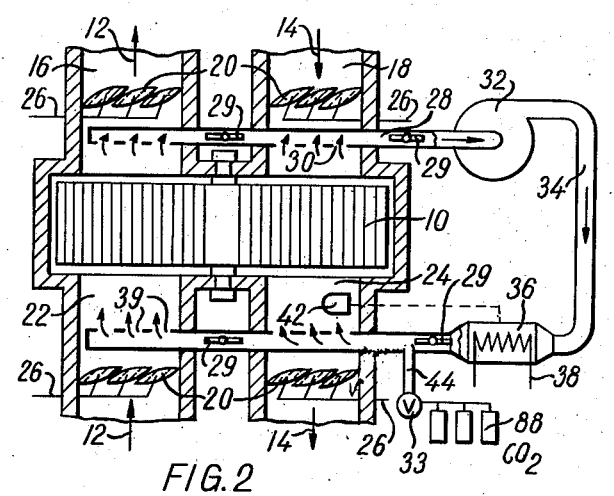
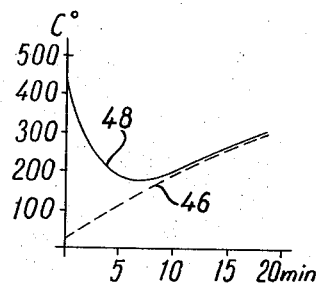
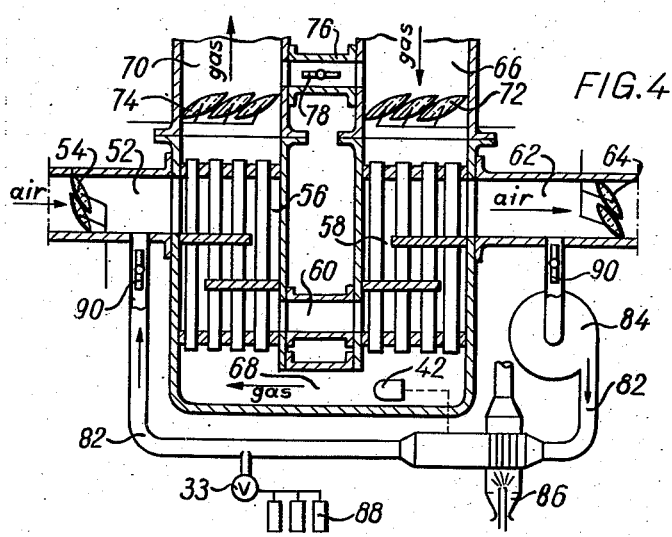

2,809,811

AIR PREHEATER WITH HEATING AND TEMPERING MEANS

Uno Olof Blomquist, Vasteras, Sweden

Application May 11, 1951, Serial No. 225,727

Claims priority, application Sweden June 15, 1950

8 Claims. (Cl. 257—3)

The present invention relates to heat exchangers in which a relatively hot gaseous medium, as for example flue gases, emits heat to a relatively cold medium as air via a heat accumulating or heat transferring metal mass.

When starting, for example, a steam boiler the heat exchanger delivers cold air to the furnace resulting in incomplete combustion, as well as in condensation in the heat exchanger and considerable deposition of soot.

The object of the present invention is to eliminate these disadvantages and the method according to the invention is characterized by the fact that the heat exchanging metal mass is reheated before starting the heat exchanger. This may be accomplished, for example, by conducting heated air to the metal mass. The device for carrying out this method comprises a fan for circulation of air through a heating source and through pipes which are in communication with the metal mass.

The invention will be hereinafter described with reference to the accompanying drawing showing three embodiments of the invention by way of example.

Figs. 1 and 2 show diagrammatically a regenerative air preheater provided with means according to the invention.

Fig. 3 illustrates a diagram showing temperature variations in the metal mass with and without preheating of said mass before starting.

Fig. 4 shows the invention adapted to a recuperative heat exchanger.

In Figs. 1 and 2, numeral 10 designates a rotor carrying heat exchanging elements, for example, in the form of undulated iron plates, between which narrow channels are formed for the alternating passage of gas and air, flowing in the directions of the arrows 12 and 14 respectively. The flue gas channel is designated by 16 and the air channel by 18 and within said two channels on each of the two sides of the rotor 10 there are provided shut off members as for example dampers 20, so that almost air tight chambers 22 and 24 may be formed in the space where the rotor is located. The shut off members 20 are suitably made of heat insulating material to prevent the conduction of heat therethrough. Further these members can be opened or closed by operating levers 26.

The difference between the embodiments according to Figs. 1 and 2 consists principally, according to Fig. 1, in having the circulation pipes 28 and 40 open into the chambers 24, whereby the heat exchanging mass in the rotor 10 is preheated when the same is passing through the chamber 24 during the rotation of the rotor 10 whereas with the embodiment according to Fig. 2 in which the pipes 28 and 40 pass through the chambers 22 and 24 the air enters through the holes 39 in the pipe 40 while it leaves these chambers through the holes 30 in pipe 28. The air is conducted from the pipe 28 to a fan 32 from which on its pressure side by means of a pipe 34 it is conducted to a heating source 36 for example having an electrical heating element 38, from which source the preheated air is conducted through the pipe 40 to the lower parts of the chambers 24 and 22 respectively through the holes 39. The embodiment according to Fig. 2 which is somewhat more complicated presents, however, an advantage over the other embodiment in that there is less risk of warping of the rotor in the heat exchanger.

29 designates dampers in the pipes 28 and 40 for shutting off the circulating air when the heat exchanger is operating. A thermostat 42, located in the chambers containing the rotor 10, controls the heating source 36 so that a desired temperature of the preheating air may be obtained and overheating of the iron mass prevented. For the same reason a suitable protective gas, as for example carbon dioxide, may be added to the heating air through a pipe 44 which will serve to temper or control the temperature of the air stream.

A thermostat 31 may be provided in the chamber 24 and acting on the valve 33 in the connecting pipe of the containers 88 with the protective gas, which thermostat is intended to prevent over heating by automatically opening the valve 33.

Fig. 3 shows the course of temperature during the starting period. The dotted line 46 illustrates the increase in temperature of the combustion air in an air preheater which is started with a cold rotor, whereas the line 48 shows corresponding temperature variations in an air preheater having means, according to the invention, where the iron mass is preheated to approximately 425° C. before the apparatus is started. As will be evident from the diagram the temperature 48 will not decrease to any extent below 200° C. during the starting period whereby the above mentioned disadvantages with a cold rotor are avoided.

Fig. 4 shows a recuperative preheater provided with means according to the invention and in which air is fed by a fan through an inlet channel 52 having a damper 54 to one of two interconnected recuperative air preheater sections 56 and 58. The air enters the second preheater section 58 through a connecting channel 60 and leaves said last mentioned preheater section through an outlet channel 62 provided with a damper 64.

The heat emitting gas is led to the preheater section 58 through a channel 66 and after passing through the same, the gas is conducted to the other preheater section 56 by means of a connecting channel 68. The gas leaves the last mentioned preheater section through a channel 70. The two channels 66 and 70 are each provided with a damper 72 and 74 respectively and interconnected by a branch channel 76 also provided with a damper 78 for by-pass purposes.

According to the invention a pipe 82 having a fan 84 is connected to the outlet pipe 62 ahead of the damper 64. In the pipe 82 there is a heating source in the form of an oil burner 86. Further there is connected a container 88 for providing a protective gas. The outlet end of the pipe 82 at the inlet of the same is provided with a valve 90 and is connected to the air inlet pipe 52 after the damper 54.

When the heat exchanger illustrated in Figs. 1 and 2 is out of operation, the arrangement according to the present invention operates in the following manner. The dampers 20 are closed and the dampers 29 are opened. The fan 32 is started and the heating element 38 is turned on, whereby the rotor will become heated and the temperature of the same kept at a desired value by means of the thermostat 42 regulating the heating source 36. When the boiler is started the valves 29 are closed and simultaneously the dampers 20 opened. Due to the fact that the heating of the rotor can be accomplished during a relatively long period the heating capacity of the element 38 may be rather small, whereby cheap electrical energy available during the night may be used.

As to the heat exchanger illustrated in Fig. 4 the arrangement according to the invention operates in the following manner.

When the heat exchanger is out of operation the dampers 72 and 74 are closed as well as the dampers 54 and 64, the valves 90 being opened, whereby the preheated air is circulating through the heat exchangers 56 and 58 by means of the channels 60, 62, pipe 82 and channel 52, the air being circulated by the fan 84 and heated by means of an oil burner 86. When the boiler is put into operation the dampers 54 and 64 as well as 72 and 74 are opened and the valves 90 simultaneously closed.

The arrangement according to the invention is not only of importance for the operation of the heat exchanger itself but also of importance as far as subsequent dust collectors or ash separators as well as fans and the stack are concerned.

What is claimed is:

1. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, means for circulating a gaseous medium through said circuit and means for heating the medium circulated therein.

2. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, a fan in said circuit for circulating a gaseous medium therethrough, heating means in said circuit for heating the medium circulating therethrough, and means for controlling the operation of said heating means.

3. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, a fan in said circuit for circulating a gaseous medium therethrough, heating means in said circuit for heating the medium circulating therethrough and temperature responsive means for automatically controlling the operation of said heating means.

4. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, a fan in said circuit for circulating a gaseous medium therethrough, heating means in said circuit for heating the medium circulating therethrough, temperature responsive means for automatically controlling the operation of said heating means, a supply of protective gas connected to said circuit and means for controlling the introduction of said protective gas into said circuit.

5. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, a fan in said circuit for circulating a gaseous medium therethrough, heating means in said circuit for heating the medium circulating therethrough, means for controlling the flow of medium through said circuit, temperature responsive means for automatically controlling the operation of said heating means, a supply of protective gas connected to said circuit and means for controlling the introduction of said protective gas into said circuit.

6. Heat exchange apparatus comprising conduit means providing separate passages for flow of two gaseous media between which heat is to be exchanged and a metal mass for effecting transfer of heat between said media, means for substantially closing both of said passages on both the inlet and outlet sides of said metal mass, means providing a substantially closed circuit including the portion of one of said passages between the closing means therein, a fan in said circuit for circulating a gaseous medium therethrough, heating means in said circuit for heating the medium circulating therethrough, means for controlling the flow of medium through said circuit, temperature responsive means for automatically controlling the operation of said heating means, a supply of protective gas connected to said circuit and temperature responsive means for automatically introducing said protective gas into said circuit.

7. Heat exchange apparatus of the regenerative type, comprising a housing, a rotor mounted for rotation within said housing and including a metallic regenerative mass for effecting transfer of heat from a relatively hot gaseous medium to a relatively cool gaseous medium, conduits connected to said housing providing separate passages for flow to and from said rotor of said gaseous media, means for substantially closing the passages for both of said media on both the inlet and outlet sides of said rotor, means providing a substantially closed circuit including the portion of at least one of said passages between the places of closure thereof and through said rotor, a fan in said circuit for circulating the gaseous medium present in the space provided by said closed circuit therethrough while said conduits are closed, heating means in said circuit for heating the medium circulating therethrough, and temperature responsive means for automatically controlling the operation of said heating means.

8. Apparatus as defined in claim 7, including means for supplying to said circuit a protective gas incapable of supporting combustion, and means for controlling the introduction of said protective gas to said circuit.

References Cited in the file of this patent

UNITED STATES PATENTS

| | | |
|---|---|---|
| 1,558,445 | Ljungstrom | Oct. 20, 1925 |
| 1,574,547 | Bell | Feb. 23, 1926 |
| 1,649,696 | Hodges | Nov. 15, 1927 |
| 2,115,338 | Lysholm | Apr. 26, 1938 |
| 2,181,053 | Hamilton | Nov. 21, 1939 |
| 2,320,911 | Cooper | June 1, 1943 |
| 2,362,940 | Skerritt | Nov. 14, 1944 |
| 2,363,870 | Karlsson et al. | Nov. 28, 1944 |
| 2,499,358 | Cooper et al. | Mar. 7, 1950 |
| 2,607,564 | Yerrick | Aug. 19, 1952 |

FOREIGN PATENTS

| | | |
|---|---|---|
| 587,035 | Great Britain | Apr. 11, 1947 |